United States Patent
Nakamura

(10) Patent No.: US 10,005,600 B2
(45) Date of Patent: Jun. 26, 2018

(54) HOSE CLAMP

(71) Applicant: TOGO SEISAKUSYO CORPORATION, Aichi-gun, Aichi (JP)

(72) Inventor: Yuji Nakamura, Aichi (JP)

(73) Assignee: TOGO SEISAKUSYO CORPORATION, Aichi-Gun, Aichi (JP)

( * ) Notice: Subject to any disclaimer, the term of this patent is extended or adjusted under 35 U.S.C. 154(b) by 281 days.

(21) Appl. No.: 14/893,650

(22) PCT Filed: May 19, 2014

(86) PCT No.: PCT/JP2014/063161
§ 371 (c)(1),
(2) Date: Nov. 24, 2015

(87) PCT Pub. No.: WO2015/001853
PCT Pub. Date: Jan. 8, 2015

(65) Prior Publication Data
US 2016/0122099 A1   May 5, 2016

(30) Foreign Application Priority Data

Jul. 2, 2013   (JP) .................................. 2013-138846

(51) Int. Cl.
*F16L 33/02*   (2006.01)
*B65D 63/02*   (2006.01)
(Continued)

(52) U.S. Cl.
CPC .............. *B65D 63/02* (2013.01); *F16B 2/245* (2013.01); *F16L 33/02* (2013.01); *F16L 33/03* (2013.01)

(58) Field of Classification Search
CPC .......... B65D 63/02; F16B 2/245; F16L 33/03; F16L 33/02
See application file for complete search history.

(56) References Cited

U.S. PATENT DOCUMENTS 4,315,348 A * 2/1982 Oetiker .................. B65D 63/02
24/20 CW
4,583,268 A * 4/1986 Horcher born Kloss ..................
F16L 33/03
24/20 CW
(Continued)

FOREIGN PATENT DOCUMENTS

CN     1520499 A    8/2004
CN     101400936 A   4/2009
(Continued)

OTHER PUBLICATIONS

International Search Report for PCT/JP2014/063161, dated Aug. 19, 2014 in English and Japanese Language.
(Continued)

*Primary Examiner* — Jason W San
(74) *Attorney, Agent, or Firm* — Smith, Gambrell & Russell, LLP

(57) ABSTRACT

A purpose is to increase a clamping force without increase in a plate thickness. A wide region (X1) is formed at one of lengthwise sides to be relatively wider and has portions bifurcated by an opening (2). A narrow region (X2) is formed at the other lengthwise side to be relatively narrower and has a portion passed between the bifurcated portions. Both widthwise side edges of the wide region (X1) are formed with respective flanges (6) by bending and a bead (7) is formed on a widthwise middle of the narrow region (X2). The flanges (6) and the bead (7) are set so that a change in
(Continued)

a section modulus is substantially symmetric about a Y axis that is a lengthwise central axis of the hose clamp.

13 Claims, 14 Drawing Sheets

(51) Int. Cl.
*F16L 33/03* (2006.01)
*F16B 2/24* (2006.01)

(56) References Cited

U.S. PATENT DOCUMENTS

| | | | | |
|---|---|---|---|---|
| 4,773,129 A * | 9/1988 | Muhr | ............ | F16L 33/03 24/20 CW |
| 4,948,178 A * | 8/1990 | Sauer | ............ | F16L 33/02 285/242 |
| 4,969,240 A * | 11/1990 | Sauer | ............ | F16L 33/03 24/20 R |
| 5,103,535 A * | 4/1992 | Ishijima | ............ | B65D 63/02 24/20 CW |
| 5,185,907 A * | 2/1993 | Kawashima | ............ | F16L 33/03 24/20 CW |
| 5,305,499 A * | 4/1994 | Oetiker | ............ | F16L 33/025 24/19 |
| 5,326,325 A * | 7/1994 | Oetiker | ............ | F16F 15/34 24/20 CW |
| 5,596,790 A * | 1/1997 | Moller | ............ | F16L 33/03 24/20 EE |
| 5,669,113 A * | 9/1997 | Fay | ............ | B65D 63/04 24/20 CW |
| 5,819,376 A * | 10/1998 | Kovalsky | ............ | F16L 33/03 24/20 CW |
| 5,864,926 A * | 2/1999 | Gyongyosi | ............ | F16L 33/03 24/19 |
| 6,021,551 A * | 2/2000 | Detable | ............ | F16L 33/02 24/20 R |
| 6,038,744 A * | 3/2000 | Zielinski | ............ | F16L 33/03 24/20 EE |
| 6,098,251 A * | 8/2000 | Zielinski | ............ | F16L 33/03 24/20 EE |
| 6,443,401 B1 * | 9/2002 | Vanderpan | ............ | A01G 9/128 248/62 |
| 6,473,943 B1 * | 11/2002 | Thacker | ............ | B65D 63/02 24/20 EE |
| 6,899,360 B1 * | 5/2005 | Flynn | ............ | F16L 33/02 285/252 |
| 7,305,740 B2 * | 12/2007 | Pina | ............ | F16L 33/03 24/20 CW |
| 7,421,930 B2 | 9/2008 | Oetiker et al. | | |
| 7,424,769 B2 * | 9/2008 | Ogino | ............ | A43C 11/00 24/20 R |
| 7,937,812 B2 * | 5/2011 | Ikeda | ............ | F16D 3/843 24/20 CW |
| 7,987,561 B2 * | 8/2011 | Zhang | ............ | F16L 33/025 24/20 CW |
| 8,127,406 B2 | 3/2012 | Morita | | |
| 8,230,556 B2 * | 7/2012 | Palau Dominguez | ............ | F16L 33/025 24/20 CW |
| 8,286,308 B2 * | 10/2012 | Streuli | ............ | F16L 33/025 24/19 |
| 8,336,834 B2 * | 12/2012 | Matsumoto | ............ | F16L 3/1222 24/20 R |
| D676,738 S * | 2/2013 | Hammond | ............ | D8/396 |
| 8,424,167 B2 * | 4/2013 | Meier | ............ | F16L 33/025 24/19 |
| 8,505,962 B2 * | 8/2013 | Henriksson | ............ | F16L 33/02 280/728.2 |
| 8,695,172 B2 * | 4/2014 | Nagai | ............ | F16L 33/03 24/20 EE |
| 8,850,664 B2 * | 10/2014 | Nakamura | ............ | F16L 33/03 24/20 CW |
| 8,875,354 B2 * | 11/2014 | Miessmer | ............ | F16L 33/025 24/19 |
| 9,009,927 B2 * | 4/2015 | Rigollet | ............ | F16L 33/03 24/270 |
| 9,057,459 B2 * | 6/2015 | Krauch | ............ | F16L 33/021 |
| 9,267,629 B2 * | 2/2016 | Miessmer | ............ | F16L 33/025 |
| D756,765 S * | 5/2016 | Zaharis | ............ | D8/396 |
| 9,546,750 B2 * | 1/2017 | Ozawa | ............ | F16L 33/03 |
| 2002/0189055 A1 * | 12/2002 | Oetiker | ............ | F16L 33/025 24/20 CW |
| 2003/0014846 A1 * | 1/2003 | Kim | ............ | B65D 63/02 24/20 R |
| 2003/0084548 A1 * | 5/2003 | Nakamura | ............ | F16L 33/03 24/20 R |
| 2003/0159255 A1 * | 8/2003 | Senovich | ............ | F16L 33/03 24/20 R |
| 2004/0134041 A1 * | 7/2004 | Craig, Jr. | ............ | F16L 33/025 24/20 CW |
| 2005/0138778 A1 | 6/2005 | Oetiker et al. | | |
| 2005/0223526 A1 * | 10/2005 | Oetiker | ............ | F16L 33/035 24/20 CW |
| 2006/0117534 A1 * | 6/2006 | Craig, Jr. | ............ | F16L 33/025 24/20 CW |
| 2007/0137439 A1 | 6/2007 | Oetiker et al. | | |
| 2008/0155794 A1 * | 7/2008 | Craig | ............ | F16L 33/025 24/20 CW |
| 2008/0155795 A1 * | 7/2008 | Craig | ............ | F16L 33/025 24/20 R |
| 2009/0049655 A1 | 2/2009 | Ikeda et al. | | |
| 2009/0049656 A1 | 2/2009 | Morita | | |
| 2009/0172924 A1 * | 7/2009 | Ito | ............ | F16B 2/08 24/20 CW |
| 2016/0264327 A1 * | 9/2016 | Nakamura | ............ | F16L 33/03 |
| 2017/0184235 A1 * | 6/2017 | You | ............ | F16L 33/02 |

FOREIGN PATENT DOCUMENTS

| | | |
|---|---|---|
| CN | 102317670 A | 1/2012 |
| JP | 02-225897 A | 9/1990 |
| JP | 10-318473 A | 12/1998 |
| JP | 2001-280566 A | 10/2001 |
| JP | 2002-276875 A | 9/2002 |
| JP | 2003-176889 A | 6/2003 |
| JP | 2006-283842 A | 10/2006 |
| JP | 2008-196709 A | 8/2008 |
| JP | 2012-180898 A | 9/2012 |

OTHER PUBLICATIONS

Chinese Office Action dated Aug. 19, 2016 in Chinese Patent Application No. 201480038166.0 (12 pages including machine translation).
Chinese Search Report dated Aug. 9, 2016 in Chinese Patent Application No. 201480038166.0 (2 pages).

* cited by examiner

HOSE CLAMP

TECHNICAL FIELD

The present invention relates to a hose clamp.

BACKGROUND ART

Conventionally used hose clamps are formed by bending a metal strip into an annular shape. One of such hose clamps has two ends from which first and second operating pieces are raised respectively. The operating pieces are pinched so that the entire hose clamp is diameter-enlarged so as to be put onto a hose or the like or diameter-reduced so as to clamp the hose or the like. Further, another conventionally known hose clamp has a triangular opening which is formed therethrough to extend in a lengthwise direction in a developed state. Undermentioned Patent Document 1 discloses an example of the hose clamp with the triangular opening.

PRIOR ART DOCUMENT

Patent Documents

Patent Document 1: Japanese Patent Application Publication No. JP-A-2002-276875

SUMMARY OF THE INVENTION

Problem to be Overcome by the Invention

The aforementioned triangular opening has purposes of improving the roundness and circumferentially uniforming a clamping force. However, when the triangular opening is formed, a punched hole is generated, thereby reducing the clamping force accordingly. As a countermeasure, it is considered to simply increase the plate thickness of the hose clamp. However, this countermeasure increases material costs and also results in a problem of weight increase.

The present invention was made in view of the foregoing circumstances and an object thereof is to provide a hose clamp which can increase the clamping force without increase in the plate thickness.

Means for Overcoming the Problem

A hose clamp according to the present invention is formed by bending a strip-shaped metal plate material into an annular shape so as to be displaceable between a diameter-reduced state and a diameter-enlarged state. The hose clamp clamps a connection of a tubular body and a counterpart to be connected to the tubular body, such as a hose. The hose clamp includes a wide region formed at one of two lengthwise sides so as to be relatively wider and having bifurcated portions and a narrow region formed at the other lengthwise side so as to be relatively narrower and having a part passed between the bifurcated portions. The wide region and the narrow region have bending portions formed integrally with the respective regions including a length range sufficient to clamp the counterpart. The bending portions are set so that a change in a section modulus is substantially symmetric about a Y axis that is a lengthwise central axis in a developed state of the hose clamp.

Effect of the Invention

According to the invention, the bending portions are formed in a region including a part clamping the counterpart such as the hose and extending over both wide and narrow regions. The section modulus is increased in the region of the bending portions. Accordingly, the clamping force to be applied to the hose or the like can be increased without increase in the plate thickness of the hose clamp. Further, the bending portions and wide and narrow regions are configured as to provide, in the hose clamp, means for providing a charge in section modulus that is substantially symmetric about a Y axis that is a lengthwise central axis in a developed state of the hose clamp.

MODE FOR CARRYING OUT THE INVENTION

Figure 1:
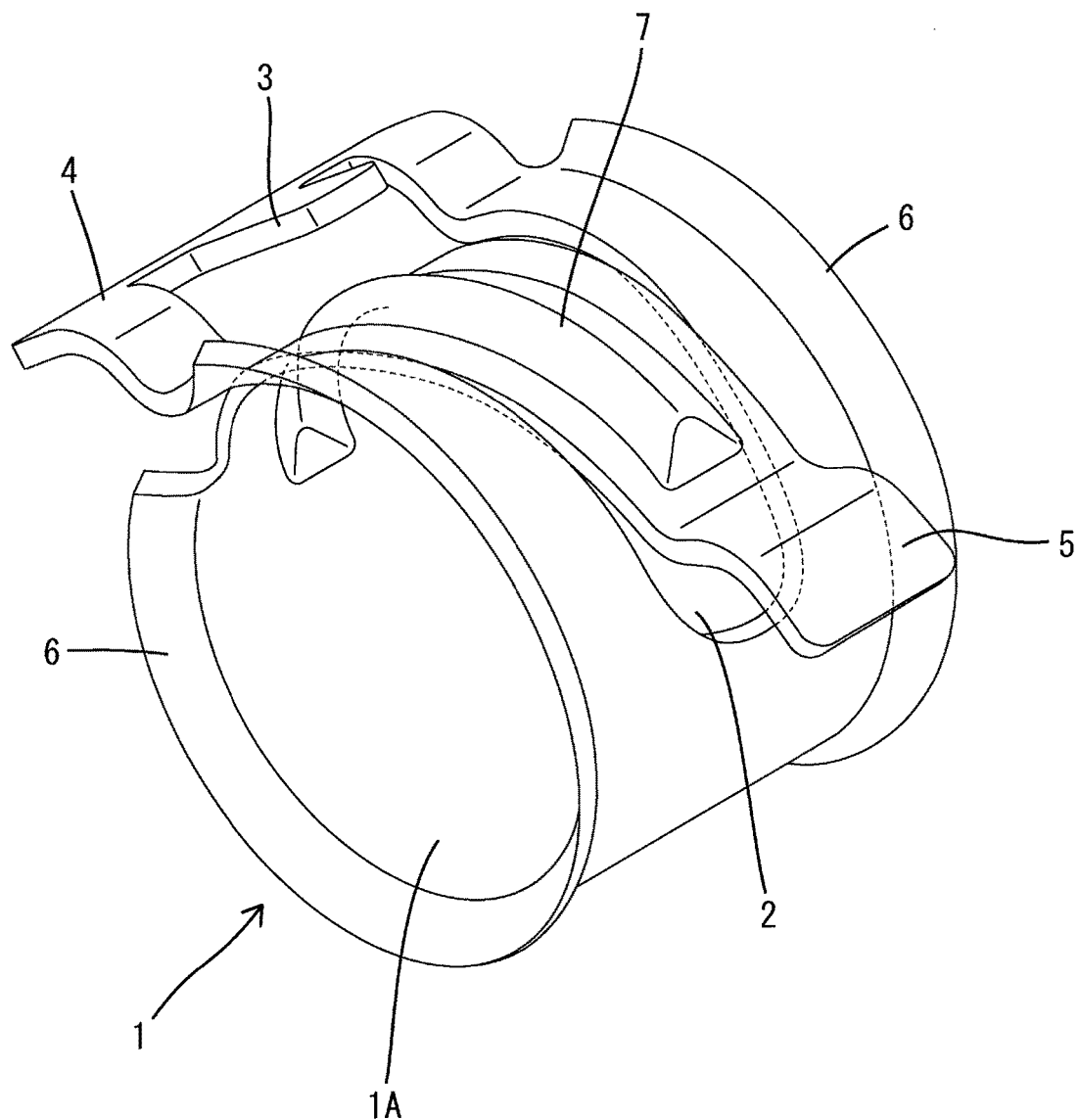
FIG. 1 is a perspective view of the hose clamp according to a first embodiment.
Figure 2:
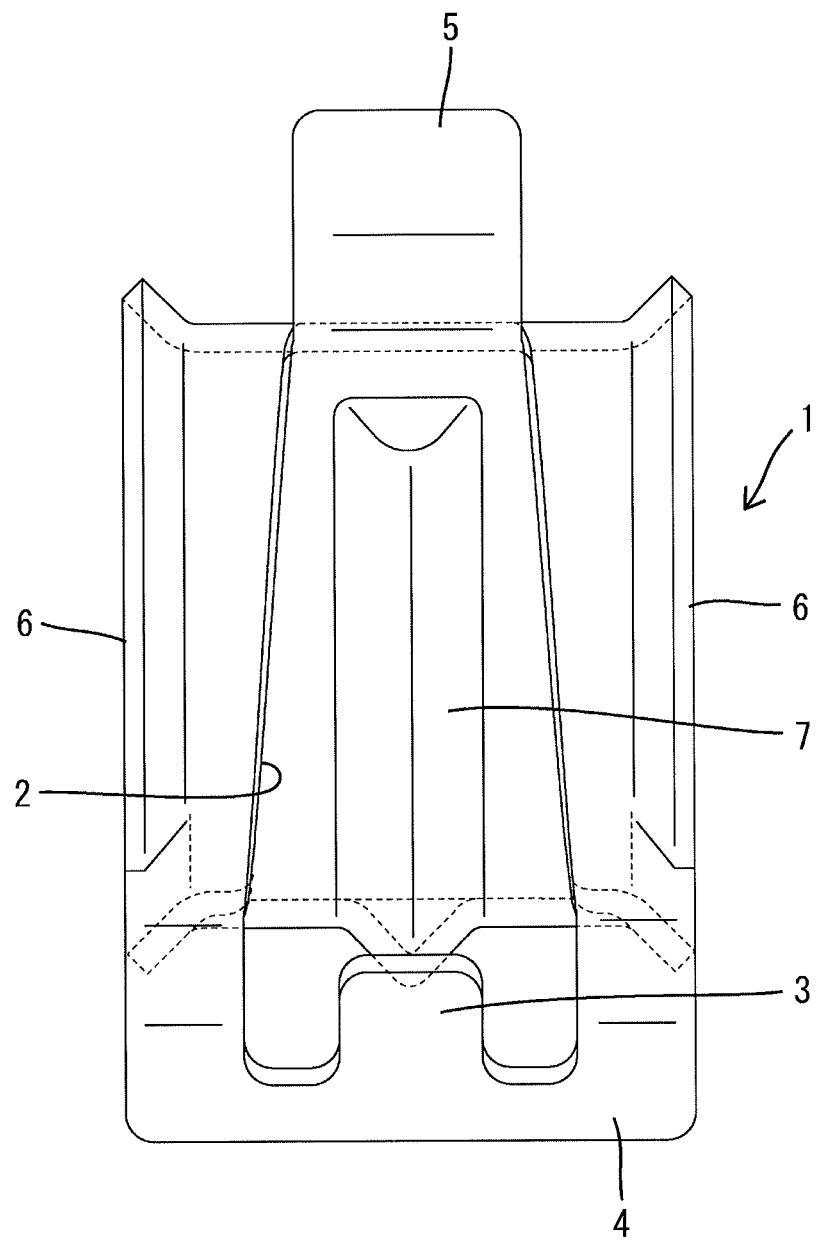
FIG. 2 is a plan view of the hose clamp.

Preferred embodiments of the invention will be described.
(1) The hose clamp according to the invention may be constructed so that the wide region has a first operating piece formed by bending an end thereof substantially radially outward and so that the narrow region has a second operating piece formed by bending an end thereof substantially radially outward. The hose clamp may further be constructed so that the wide region has a widthwise side edge which is bent over a length range from a boundary between the wide and narrow regions substantially to the first operating piece thereby to be formed into a flange and the flange serves as the bending portion. The hose clamp may further be constructed so that the narrow region has both widthwise side edges and a bead is formed between the widthwise side edges over a length range from the boundary between the wide and narrow regions substantially to the second operating piece by a pressing process and the bead serves as the bending portion.

According to the above-described construction, the flange can easily be formed in the wide region by bending the side edge. Further, since the bead is formed in the widthwise middle in the narrow region by a pressing process, the bending portion can easily be formed in the narrow region where it is difficult to bend the side edges.

(2) The bead and the flange may partially overlap with respect to a lengthwise direction.

If the flange and the bead do not overlap, stress would be concentrated on the boundary between the flange and the bead, which may cause deformation at the boundary. However, according to the above-described construction, the stress concentration can be avoided.

(3) The flange may be bent outward along a circumferential direction, so that a diameter of the widthwise side edge in the wide region is increased when the hose clamp is viewed from a direction of axis.

According to the above-described construction, the widthwise side edge of the clamping portion is less likely to be caught on an end surface of the hose or the like when the hose clamp is put onto the hose or the like, with the result that the putting can easily be carried out.

(4) An angle made by an outer periphery of the wide region and the flange may be set to be gradually rendered larger as the flange extends from a lengthwise central part to a lengthwise end side when the hose clamp is in a developed state.

(5) The flange may have a bending height from an outer periphery of the wide region, which is set to be gradually rendered smaller as the flange extends from a lengthwise central part to a lengthwise end side when the hose clamp is in a developed state.

(6) The bead may be formed to protrude to the outer surface side in a forming range thereof and may have a protruding height which is set to be gradually rendered lower as the bead extends from a lengthwise central part to a lengthwise end side when the hose clamp is in a developed state.

(7) The flange may be formed by curling both side edges of the wide region to the outer surface side into an arc shape, respectively, or by folding both side edges of the wide region to the outer surface side into a close-contact state, respectively.

Next, first to fifth embodiments of the hose clamp according to the invention will now be described with reference to the accompanying drawings. In each one of the embodiments, the hose clamp is used to clamp a connection of a tubular body such as pipe and a hose or the like (including a tube).

First Embodiment

Figure 3:
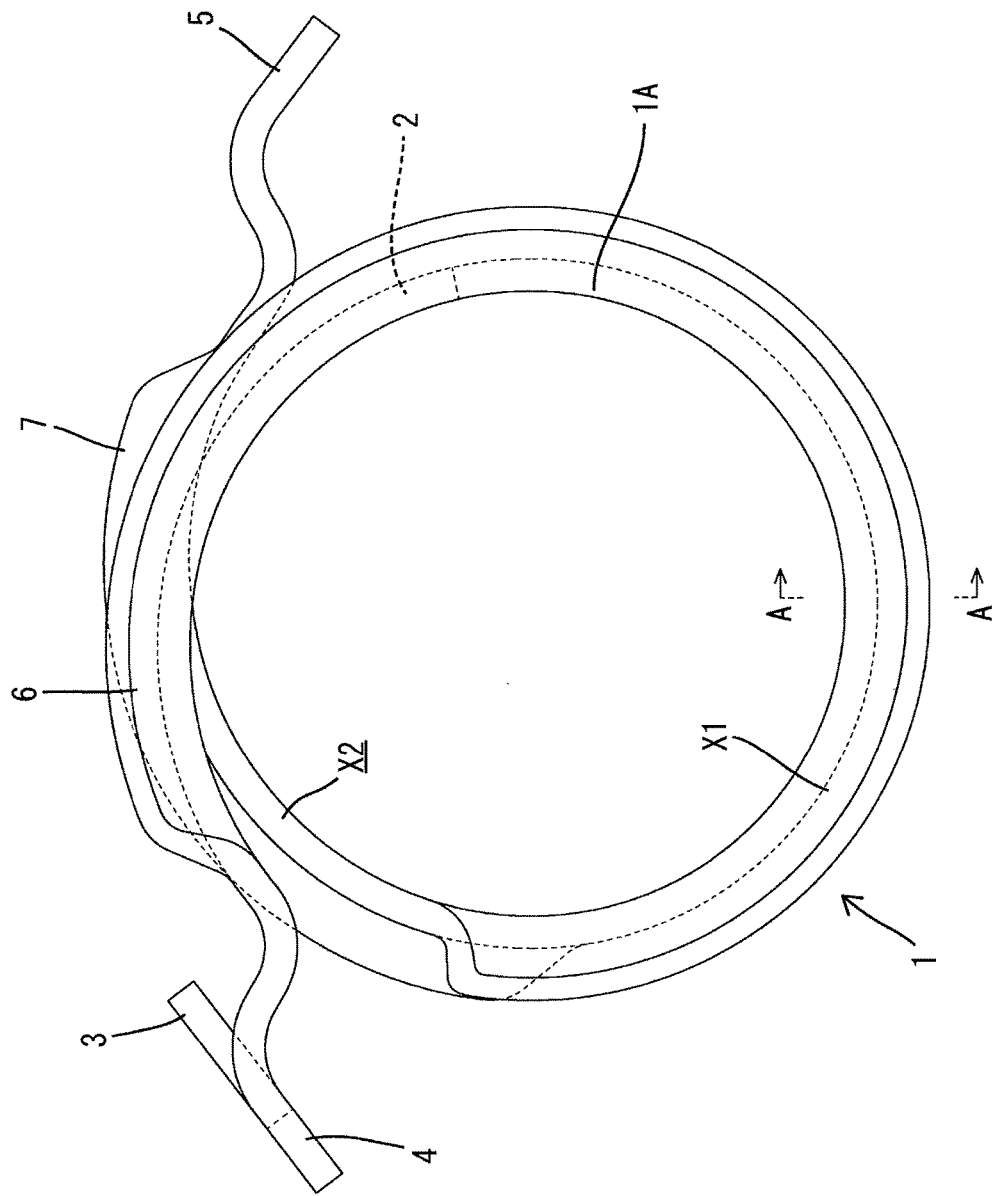
FIG. 3 is a front view of the hose clamp in a diameter-reduced state.
Figure 4:
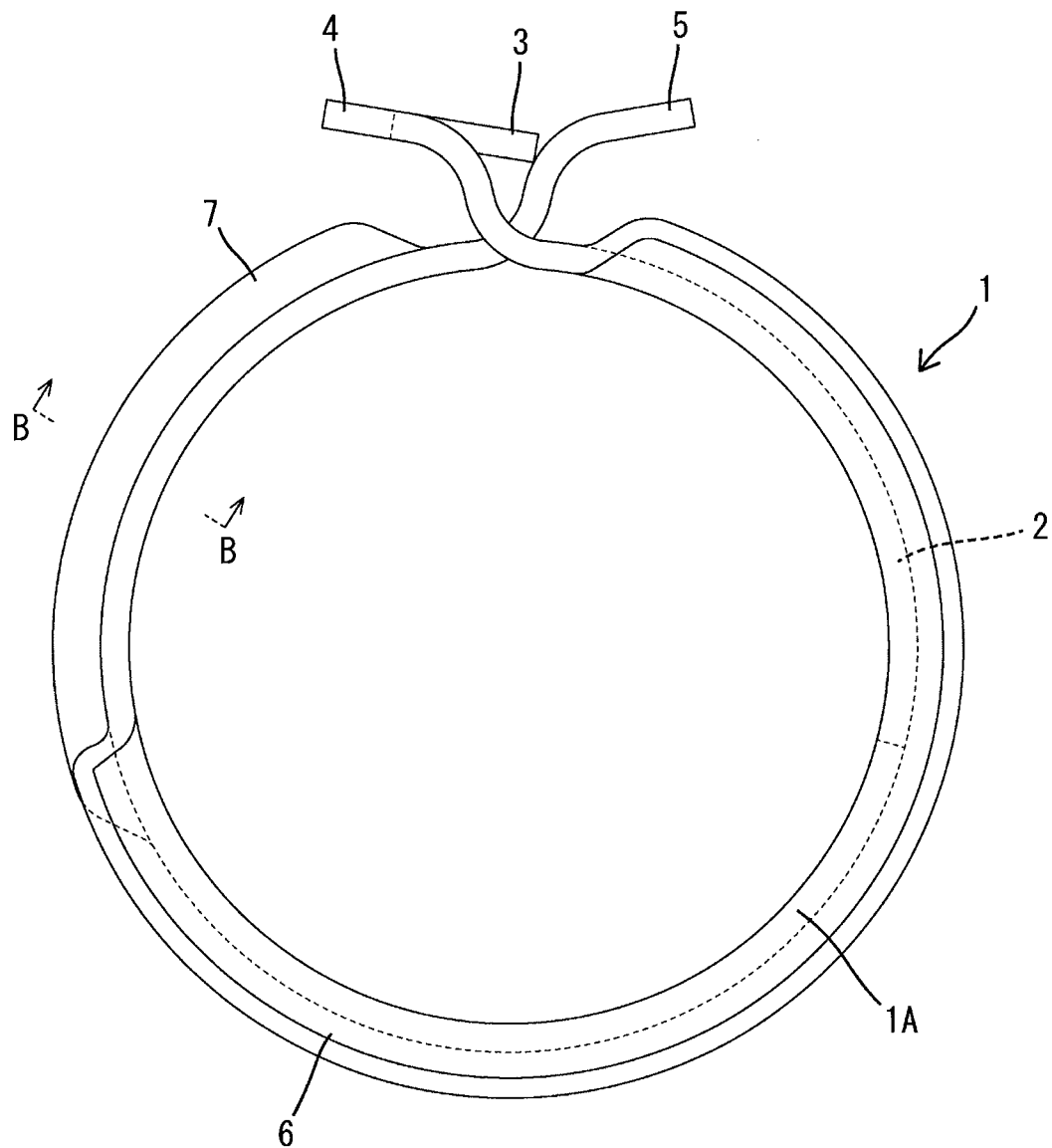
FIG. 4 is a front view of the hose clamp in a diameter-enlarged state.
Figure 5:
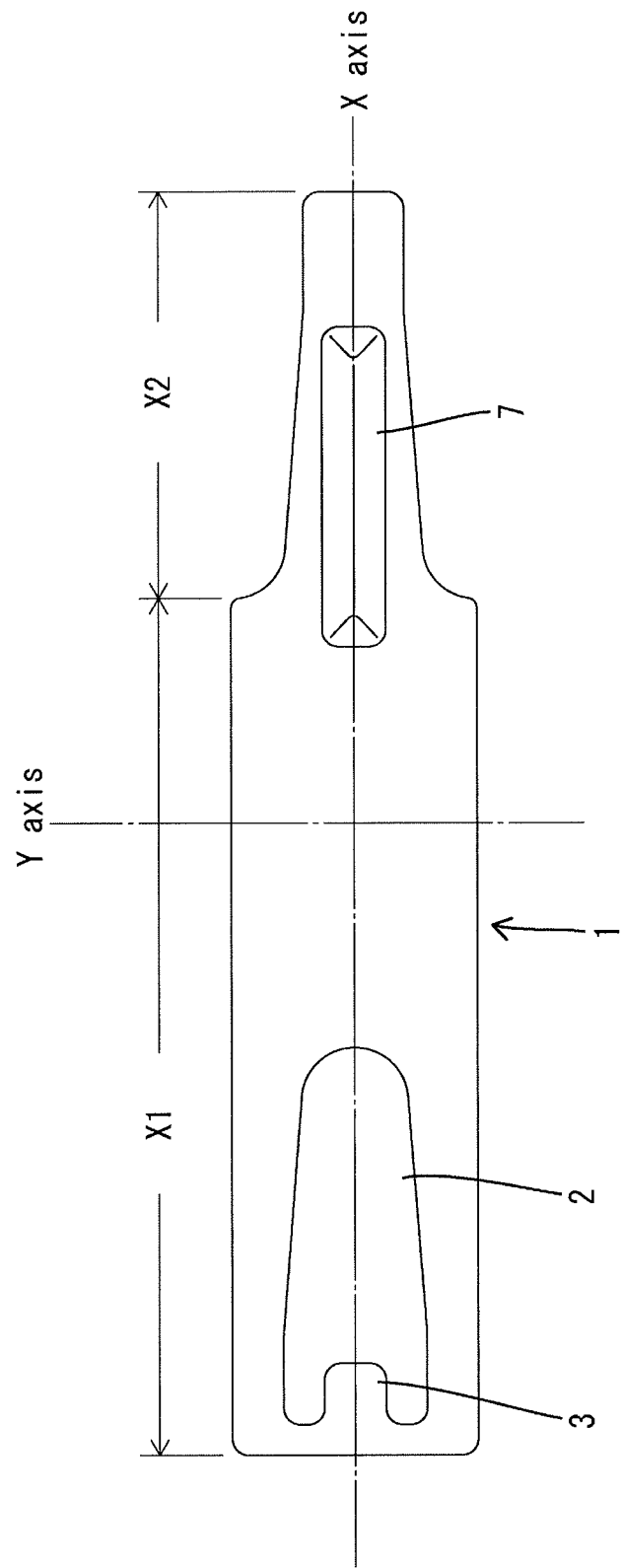
FIG. 5 is a developed view of the hose clamp.

FIGS. 1 to 8 show a hose clamp 1 according to a first embodiment. FIG. 5 shows the hose clamp 1 in a developed form. As shown, the hose clamp 1 is formed of a strip-shaped leaf spring material. The hose clamp 1 includes a wide region (a region X1 as shown in FIG. 5) which has a relatively larger width and occupies substantially two thirds of a lengthwise range and a narrow region (a region X2 as shown in FIG. 5) which has a relatively smaller width and occupies substantially the remaining one third of the range.

The wide region X1 is formed to have a uniform width over a substantially entire range in a lengthwise direction (an X axis direction). The wide region X1 has an opening 2 formed through a part near a distal end thereof, so that the part of the wide region X1 formed with the opening 2 is bifurcated. The opening 2 is formed to be elongate in the X direction and to be open symmetrically about the X axis. The opening 2 is further formed so that an opening width thereof is gradually increased from a Y-axis side end toward the distal end. More specifically, the Y-axis side end of the opening is formed into a semicircular shape and into a flared shape such that the opening width thereof is linearly increased from the semicircular portion toward the distal end side, and thereafter, a distal end is continued to a part extending substantially in parallel to both side edges of the wide region. A limiting piece 3 which will be described in detail later is formed integrally with the hose clamp 1 and protrudes inward from a widthwise middle of the distal end.

The hose clamp 1 is bent into an annular shape about the Y axis with respect to the lengthwise direction as shown in FIG. 1. The narrow region X2 is passed through the opening 2 on this occasion with the result that both ends of the hose clamp 1 are circumferentially replaced in position by each other, so that the entire hose clamp 1 is formed into the annular shape by bending. Consequently, the hose clamp 1 includes a body 1A capable of clamping a hose or the like and first and second operating pieces 4 and 5 protruding outward from the body 1A.

The first operating piece 4 is formed by raising a distal end of the wide region X1 substantially radially outward by a predetermined angle and thereafter by bending the distal end backward by substantially the same angle. The second operating piece 5 is formed on a distal end of the narrow region X2 substantially in the same length range to the first operating piece 4 and bent in the same manner as the first operating piece 4. In a free state, the hose clamp 1 is in a diameter-reduced state in which the inner diameter of the body 1A is reduced and both operating pieces 4 and 5 are circumferentially spaced away from each other, as shown in FIG. 3. However, when both ends of the first and second operating pieces 4 and 5 are held by a tool or the like to come close to each other, so that the hose clamp 1 can be shifted to a diameter-enlarged state in which the inner diameter of the body 1A is enlarged, as shown in FIG. 4. The aforementioned limiting piece 3 protrudes inward from the middle of the opening edge at the distal end side. When the operating pieces 4 and 5 are held thereby to come close to each other, a distal end of the limiting piece 3 abuts against a second operating piece 5, whereby the limiting piece 3 can limit the approach of the operating pieces 4 and 5 to each other.

Bending portions are set in the wide region X1 and the narrow region X2 in the body 1A to serve as a means for increasing a section modulus, respectively. In the first embodiment, the bending portions include flanges 6 formed on the wide region X1 side and a bead 7 formed on the narrow region X2 side.

Figure 6:
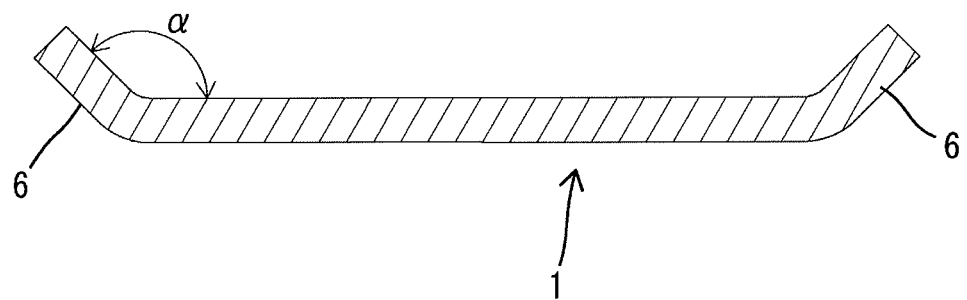
FIG. 6 is a sectional view taken along line A-A in FIG. 3.

Firstly, the paired flanges 6 are formed integrally on both widthwise side edges of the wide region X1 respectively. Regarding length ranges, the flanges 6 are formed continuously from a boundary between the wide region X1 and the narrow region X2 to a part of the hose clamp 1 slightly near another part from which the first operating piece 4 is raised. Cross-sectional configurations of the flanges 6 are shown in FIG. 6. As shown, the flanges 6 are formed by obliquely bending both widthwise side edges of the wide region X1 upwardly outward, respectively. In the embodiment, a width and a bending angle (an angle made by each flange and an outer surface of the wide region: angle α as shown in FIG. 6) of each flange 6 are uniform over an entire length of the hose clamp 1, and the angle α is set to be obtuse.

On the other hand, one strip of bead 7 is formed on the widthwise middle of the narrow region X2 side. Regarding a length range, the bead 7 is formed continuously from a position belonging to the boundary between the wide region X1 and the narrow region X2 and entering slightly into the wide region X1 side to a part of the hose clamp 1 slightly near another part from which the second operating piece 5 is raised. Accordingly, the flanges 6 and the bead 7 have a positional relationship such that forming ranges of the flanges 6 and the bead 7 partially overlap with respect to the lengthwise direction. If the forming ranges of the flanges 6 and the bead 7 do not partially overlap, stress would be concentrated on the boundary between each flange 6 and the bead 7, which may cause deformation at the boundary. However, when the forming ranges of the flanges 6 and the bead 7 overlap excessively, a range in which the section modulus is increased by the overlapping expands locally. Accordingly, it would be desirable to set an overlapping length range to a minimum range that does not cause stress concentration.

Figure 7:
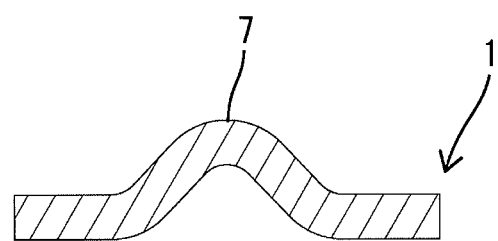
FIG. 7 is a sectional view taken along line B-B in FIG. 4.

Further, the bead 7 is formed by bending the widthwise middle of the narrow region X2 side by a press so as to protrude outward. The bead 7 has a sectional shape formed into a curved shape which has an arc-shaped top edge and spreads toward a base side, as shown in FIG. 7. In the embodiment, the bead 7 is formed to have a uniform height and a uniform width (a width in the direction perpendicular to an extending direction of the bead 7) over an entire length thereof.

Thus, as shown in FIG. 5, when the hose clamp 1 is completed, the flanges 6 and the bead 7 are set so that a change in the section modulus is substantially symmetric about the Y axis.

Figure 8:
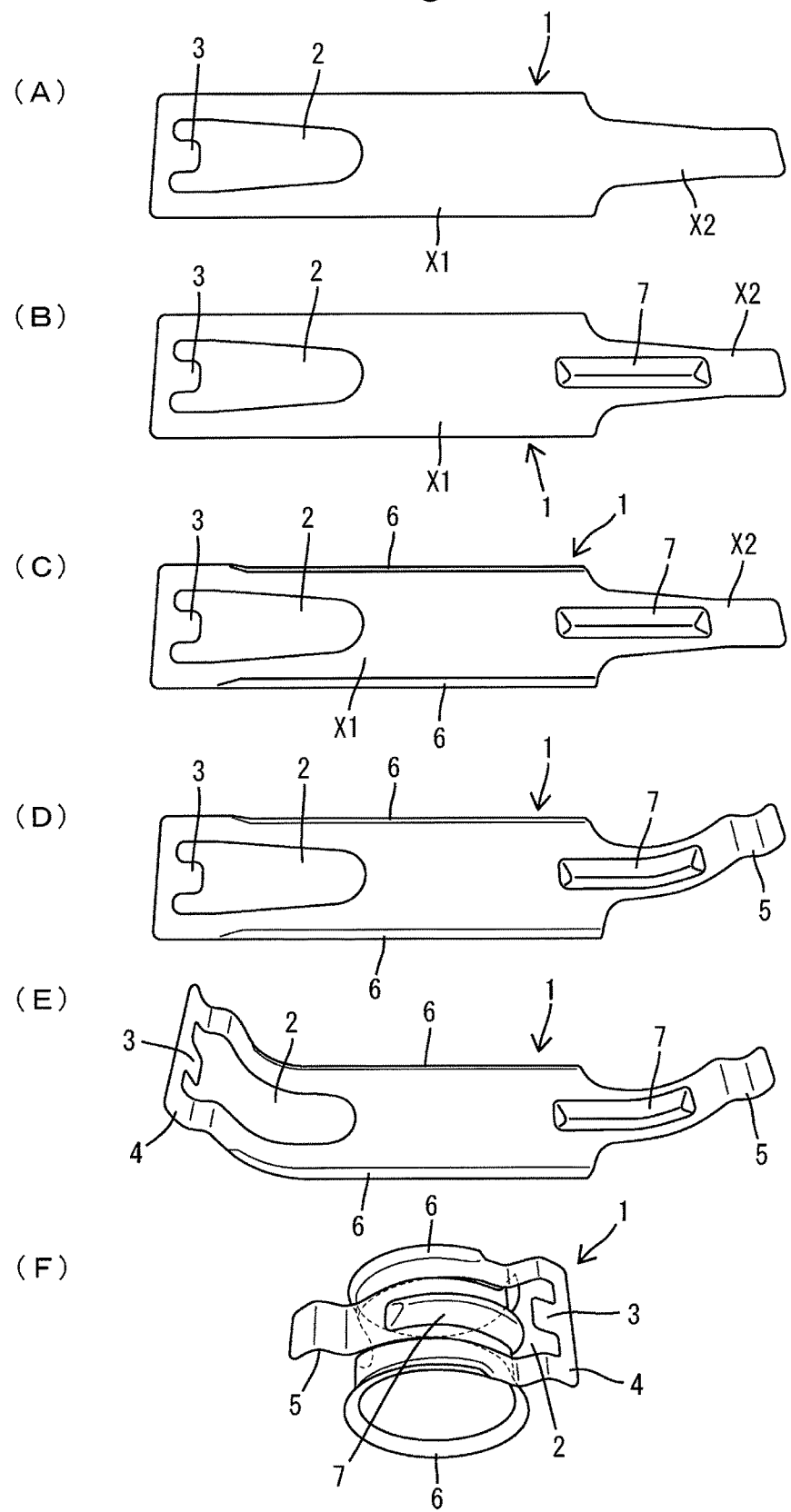
FIG. 8 shows a processing procedure of the hose clamp according to the first embodiment, including (A) showing the hose clamp stamped out by a press, (B) showing the hose clamp on which a bead is formed, (C) showing the hose clamp on which a flange is formed, (D) showing the hose clamp on which a second operating piece is formed and a narrow region side is bent, (E) showing the hose clamp on which a first operating piece is formed and a wide region side is bent, and (F) showing the completed hose clamp.

A machining procedure of the hose clamp 1 according to the first embodiment will now be described with reference to (A) to (F) of FIG. 8. Firstly, a plate-shaped base material is punched through so that a piece shaped as shown in (A) of FIG. 8 is obtained. Next, the bead 7 is bent at the narrow region X2 side by the press (the state as shown in (B) of FIG. 8). A recessing process is carried out so that the bead 7 protrudes to back side of the drawing paper in the figure. Subsequently, the flanges 6 are formed on both widthwise side edges of the wide region X1 by a bending process respectively (the state as shown in (C) of FIG. 8). The flanges 6 are formed by bending the respective side edges in the same direction as a protruding direction of the bead 7 in the figure.

Subsequently, the second operating piece 5 is formed and the narrow region X2 side is bent. In this bending process, the narrow region X2 side is bent to be raised into an arc shape with a predetermined curvature about the boundary between the wide and narrow regions X1 and X2 while a root side of the bead 7 remains unprocessed. In this case, a direction in which the narrow region X2 side is bent to be raised into the arc shape is opposed to the projecting direction of the bead 7 (the state as shown in (D) of FIG. 8). Subsequently, the first operating piece 4 is formed and the wide region X1 side is bent. In this bending process, the distal end side of the wide region X1 is bent to be raised into an arc shape with substantially the same curvature as described above. In this case, too, a direction in which the distal end side of the wide region X1 is bent to be raised into the arc shape is opposed to the bending direction of the flanges 6 (the state as shown in (E) of FIG. 8).

Finally, the entire hose clamp 1 is bent about a lengthwise center line (the Y axis in FIG. 5) thereof with substantially the same curvature as described above into an arc shape. In this case, the narrow region X2 is passed through the opening 2 in the wide region X1 with the result that both lengthwise (circumferential) ends of the hose clamp 1 are circumferentially replaced in position by each other, so that the hose clamp 1 is formed into the annular shape. Thus, the hose clamp 1 having a predetermined configuration is obtained.

In the hose clamp 1 constructed as described above, the change in the section modulus is set to be substantially symmetric about the Y axis. This increases a clamping force to be applied to the hose or the like, over an entire circumference of the hose clamp 1. For this purpose, the bending portions are formed as the flanges 6 and the bead 7 respectively instead of employing a punching out manner by way of a conventional triangular opening. In other words, on the contrary, the hose clamp 1 is thickened thereby to be able to increase a clamping force.

Since the stiffness of the hose clamp 1 is increased by forming the flanges 6 and the bead 7 in the above-described manner, the hose clamp 1 can be formed using a material having a smaller plate thickness as compared with conventional hose clamps. Consequently, the hose clamp 1 can be rendered more lightweight and material costs can be reduced.

Further, the flanges 6 and the bead 7 extend up to portions near the root portions of the first and second operating pieces 4 and 5 respectively. Consequently, occurrence of buckling can be prevented when both operating pieces 4 and 5 are operated.

Further, an insertion hole of the body 1A, through which a hose or the like is inserted, is formed with the flanges 6 extending substantially over entire circumferential edges of both sides of the body 1A respectively. The flange 6 is spread outward into an inverse tapered shape. Accordingly, the hose clamp 1 is not caught on the hose or the like when put onto the hose or the like, and the flange guides the insertion of the hose or the like through the hose clamp 1. Thus, an effect that the insertion can smoothly be carried out can be also obtained.

Second Embodiment

Figure 9:
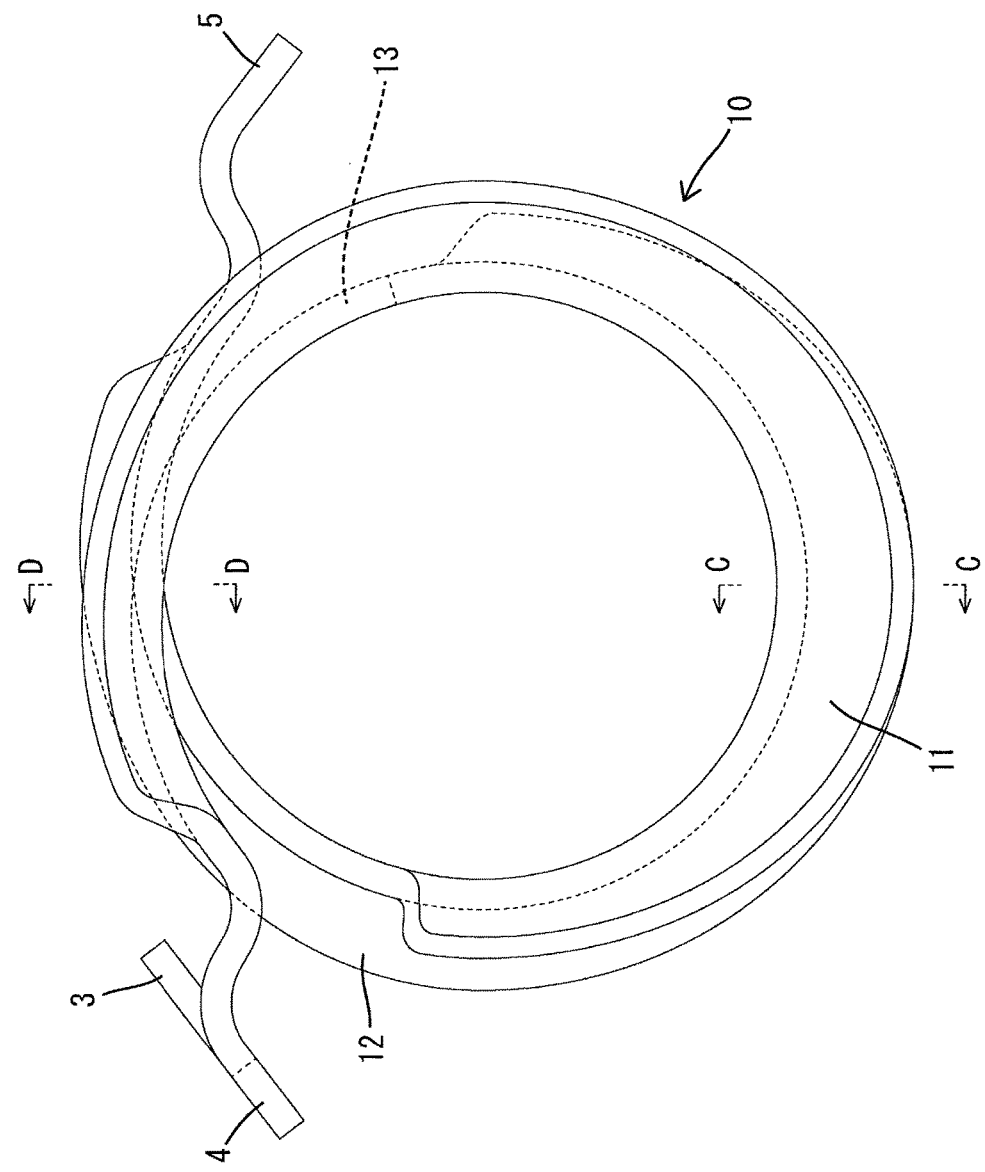
FIG. 9 is a front view of the hose clamp according to a second embodiment.
Figure 10:
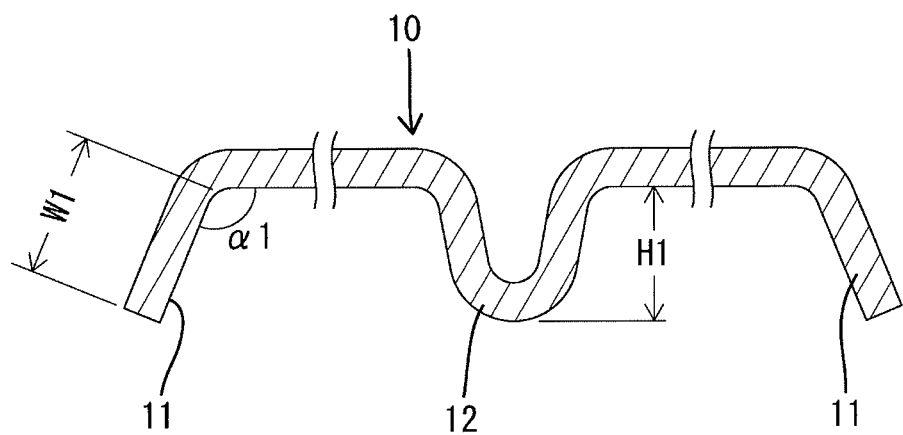
FIG. 10 is a sectional view taken along line C-C in FIG. 9.
Figure 11:
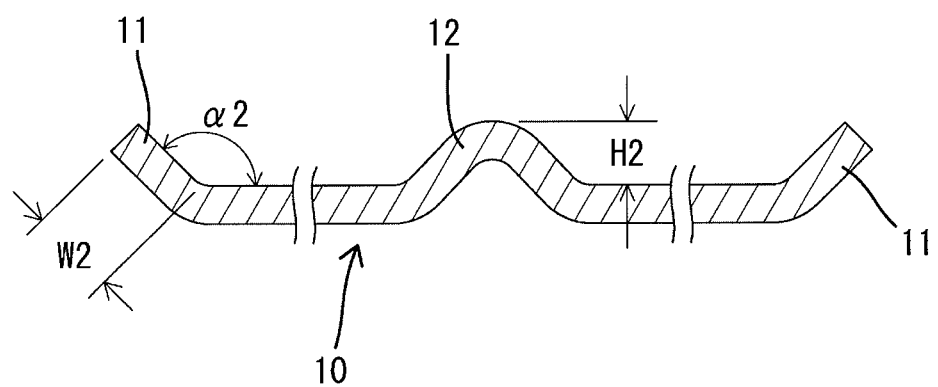
FIG. 11 is a sectional view taken along line D-D in FIG. 9.

FIGS. 9 to 11 show a hose clamp 10 according to a second embodiment. A forming range of the bead 12 in the second embodiment differs from that of the bead 7 in the first embodiment although the flanges 11 in the second embodiment have the same lengthwise (or circumferential) forming range as in the first embodiment, as shown in FIG. 9. More specifically, the bead 12 in the second embodiment has one end at the distal end side of the hose clamp 10 in the narrow region X2. Although the end of the bead 12 has the same location as in the first embodiment, the bead 12 is caused to extend so that the other end thereof is located at a position slightly before an opening 13 in the wide region X1.

FIG. 10 is a sectional view taken along line C-C in FIG. 9 and more specifically, shows a sectional configuration along the Y axis of the hose clamp 10. FIG. 11 is a sectional view taken along line D-D in FIG. 9 and more specifically, shows a sectional configuration of respective portions near both ends of the hose clamp 10. The flanges 11 have respective bending widths set to be symmetric about the Y axis and to gradually become smaller as the flanges come near both end sides from the Y axis respectively (W1→W2: W1>W2). Furthermore, the flanges 11 have respective bending angles relative to the outer circumferential surface are also set to be symmetric about the Y axis and to gradually become larger as the flanges come near both end sides from the Y axis respectively ($\alpha1\rightarrow\alpha2:\alpha1<\alpha2$). On the other hand, the bead 12 has a protrusion height that is gradually lower as the bead 12 comes near both end sides from the Y axis (H1→H2:H1>H2). Thus, the hose clamp 10 according to the second embodiment includes the bead 12 and the flanges 11 all of which are also set so that a change in the section modulus is substantially symmetric about the Y axis, in the same manner as in the first embodiment.

The second embodiment constructed as described above works in the same manner and can achieve the same advantageous effects as the first embodiment. In addition, the clamping force can be uniformed in the circumferential direction.

Third Embodiment

Figure 12:
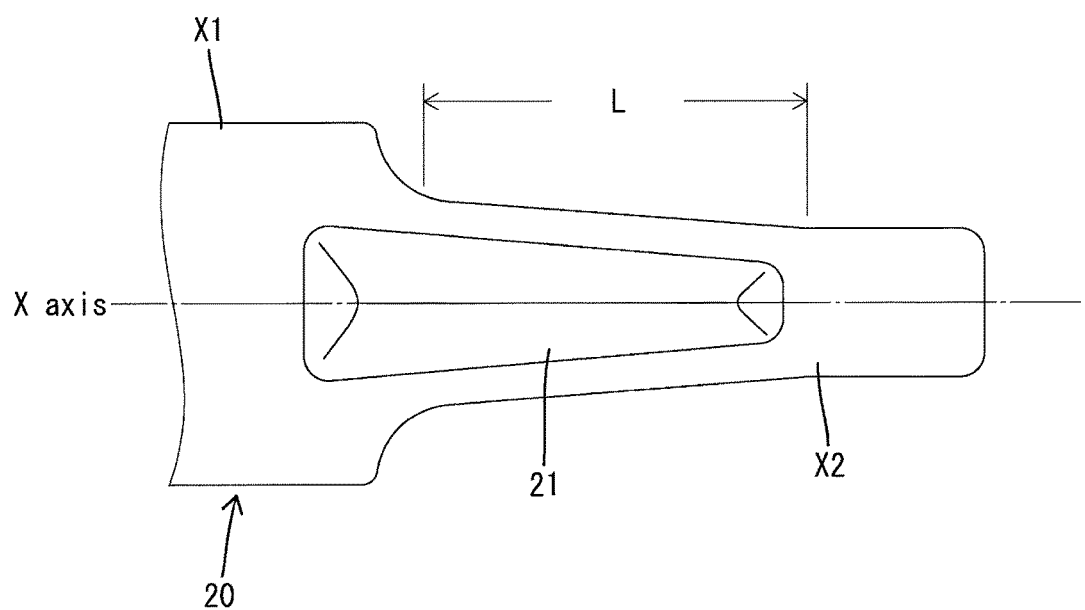
FIG. 12 is an enlarged view of a narrow region side of the hose clamp according to a third embodiment.

FIG. 12 shows a narrow region X2 side of the hose clamp 20 according to a third embodiment in an enlarged form. As shown, the hose clamp 20 is formed so that the width of the narrow region X2 is gradually reduced in a range (designated by symbol "L") with a predetermined length, starting from the boundary between the wide and narrow regions X1 and X2 and leading to the distal end side. The width of the bead 21 is correspondingly set to be gradually reduced from the boundary between the wide and narrow regions X1 and X2 to the distal end side. In more detail, the bead 21 is formed to be symmetric about the X axis. The bead 21 has an end located in the wide region side and is formed over a range near an end of a range designated by symbol "L". The bead 21 is formed so that a width thereof is gradually reduced as the bead 21 extends to the distal end side.

The third embodiment is similar to the first and second embodiments in the other respects and works in the same manner and can achieve the same advantageous effects as the first and second embodiments.

Fourth Embodiment

Figure 13:
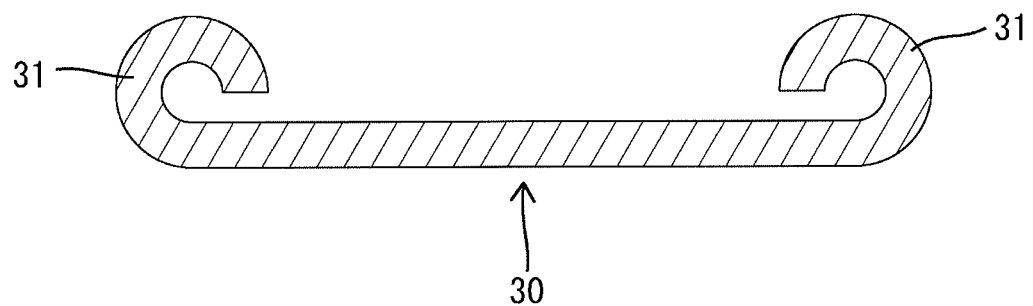
FIG. 13 is a sectional view of the flange of the hose clamp according to a fourth embodiment.

FIG. 13 shows flanges 31 of the hose clamp 30 according to a fourth embodiment in an enlarged form. The flanges in the present invention involve the flanges with the shown sectional configuration. More specifically, the flanges 31 are formed by curling both widthwise side edges of the hose clamp 30 to the outer periphery side. A lengthwise (circumferential) forming range of each flange 31 is the same as those in the first and second embodiments. A height of the curled part may be uniform over an entire length of each flange 31 or may be symmetric about the Y axis and be gradually reduced as each flange 31 extends from the Y axis to the distal end side.

Fifth Embodiment

Figure 14:
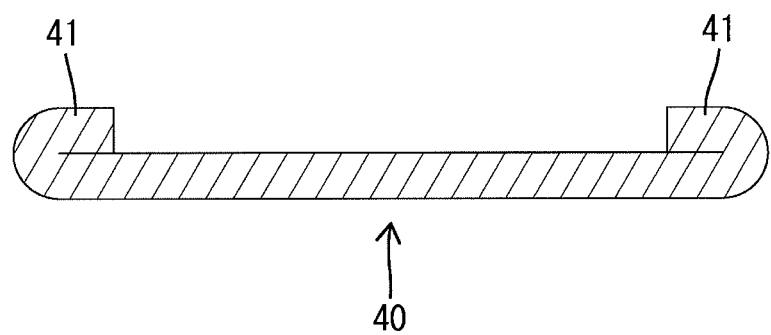
FIG. 14 is a sectional view of the flange of the hose clamp according to a fifth embodiment.

FIG. 14 shows flanges 41 of the hose clamp 40 according to a fifth embodiment in an enlarged form. The flanges in the present invention involve the flanges with the shown sectional configuration. More specifically, the flanges 41 are formed by folding back both widthwise side edges of the hose clamp 40 to the outer periphery side so that the widthwise side edges are brought into close contact with the respective outer peripheral sides. A lengthwise (circumferential) forming range of each flange 41 is the same as those in the first and second embodiments. A width of the folded part may be uniform over an entire length of each flange 41 or may be symmetric about the Y axis and be gradually reduced as each flange 41 extends from the Y axis to the distal end side.

Other Embodiments

The invention should not be limited to the embodiments described above with reference to the drawings. For example, the technical scope of the invention involves the following embodiments.

(1) Although two different types of bending portions (the flanges and the bead) are provided in the wide region side and the narrow region side in the foregoing embodiments respectively, the same type of bending portion, for example, flanges or beads may be provided in both the wide region and the narrow region.

(2) Although the hose clamps are of the type in which means is not provided for holding the hose clamp in the diameter-enlarged state in the foregoing embodiments, a discrete holder may be provided to hold both operating pieces in a proximity state.

(3) Although the ends of the wide region side are connected together so that the opening is closed, in the foregoing embodiments, the ends may be disconnected so that the opening remains open at the distal end side.

(4) Although the flanges are bent outward and the bead also protrudes outward in the foregoing embodiments, the flanges may be bent inward and the bead may also protrude inward.

(5) Although the flanges and the bead are formed to be continuous in the lengthwise (circumferential) direction in the foregoing embodiments, a plurality of divided flanges and a plurality of divided beads may be formed in a discontinuous manner.

(6) Although a single strip of bead 7 is formed in the foregoing embodiments, a plurality of strips of beads may be formed in parallel to each other or a single strip of bead 7 may be divided into a plurality of strips in the middle.

EXPLANATION OF REFERENCE SYMBOLS 1, 10, 20, 30, 40 . . . hose clamp
2, 13 . . . opening
4 . . . first operating piece
5 . . . second operating piece
6, 11, 31, 41 . . . flange
7, 12, 21 . . . bead
X1 . . . wide region
X2 . . . narrow region

The invention claimed is:

1. A hose clamp which is formed by bending a strip-shaped metal plate material into an annular shape so as to be displaceable between a diameter-reduced state and a diameter-enlarged state, the hose clamp being configured to clamp a connection of a tubular body and a counterpart to be connected to the tubular body, the hose clamp comprising:
   a wide region formed at one of two lengthwise sides so as to be relatively wider and having bifurcated portions; and
   a narrow region formed at the other lengthwise side so as to be relatively narrower and having a part passed between the bifurcated portions,
   wherein the wide region and the narrow region have bending portions formed integrally with the respective regions including a length range sufficient to clamp the counterpart;
   wherein the bending portions include flanges respectively formed by bending both widthwise side edges of the wide region upwardly and a bead formed by bending a part of the narrow region located between both widthwise side edges by press so that the bead protrudes outward and has a curved shape such that an arc-shaped top edge thereof spreads toward a base side, the flanges and the bead being set so that a change in a section modulus is substantially symmetric about a Y axis that is a lengthwise central axis in a developed state of the hose clamp; and wherein the bead and the flanges partially overlap with respect to a length direction.

2. The hose clamp according to claim 1, wherein the wide region has a first operating piece formed by bending an end thereof substantially radially outward, and the narrow region has a second operating piece formed by bending an end thereof substantially radially outward.

3. The hose clamp according to claim 2, wherein the flanges are bent outward along a circumferential direction, so that a diameter of the widthwise side edge in the wide region is increased when the hose clamp is viewed from a direction of axis.

4. The hose clamp according to claim 2, wherein an angle made by an outer periphery of the wide region and the flanges is set to be gradually rendered larger as the flanges extend from a lengthwise central part to a lengthwise end side when the hose clamp is in a developed state.

5. The hose clamp according to claim 2, wherein the flanges have a bending height from an outer periphery of the wide region, which is set to be gradually rendered smaller as the flanges extend from a lengthwise central part to a lengthwise end side when the hose clamp is in a developed state.

6. The hose clamp according to claim 2, wherein the bead is formed to protrude to the outer surface side in a forming range thereof and has a protruding height which is set to be gradually rendered lower as the bead extends from a lengthwise central part to a lengthwise end side when the hose clamp is in a developed state.

7. The hose clamp according to claim 2, wherein the flanges are formed by curling both side edges of the wide region to the outer surface side into an arc shape, respectively.

8. The hose clamp according to claim 2, wherein the flanges are formed by folding both side edges of the wide region to the outer surface side into a close-contact state, respectively.

9. A hose clamp which is formed by bending a strip-shaped metal plate material into an annular shape so as to be displaceable between a diameter-reduced state and a diameter-enlarged state, the hose clamp being configured to clamp a connection of a tubular body and a counterpart to be connected to the tubular body, the hose clamp comprising:
a wide region formed at one of two lengthwise sides so as to be relatively wider and having bifurcated portions; and
a narrow region formed at the other lengthwise side so as to be relatively narrower and having a part passed between the bifurcated portions,
wherein the wide region and the narrow region have bending portions formed integrally with the respective regions including a length range sufficient to clamp the counterpart; and
wherein the bending portions and wide and narrow regions are configured as to provide, in the hose clamp, means for providing a change in section modulus that is substantially symmetric about a Y axis that is a lengthwise central axis in a developed state of the hose clamp,
wherein the means for providing a change in the section modulus includes, to a first side of the Y-axis, a combination of flanges provided on each of the wide region sides and a diverging opening in the wide region, and to an opposite side of the Y-axis, a combination of a bead formed in a part of the narrow region located between both widthwise side edges of the narrow region together with converging side edges in the narrow region,
wherein the bead and the flanges partially overlap with respect to a circumferential length direction in the developed state of the hose clamp, and
wherein the flanges are formed by curling both side edges of the wide region to the outer surface side into an arc shape, respectively.

10. The hose clamp according to claim 9, wherein the wide region has a first operating piece formed by bending an end thereof substantially radially outward, and the narrow region has a second operating piece formed by bending an end thereof substantially radially outward.

11. The hose clamp according to claim 9, wherein the bead is formed to protrude to the outer surface side in a forming range thereof and has a protruding height which is set to be gradually rendered lower as the bead extends from a lengthwise central part to a lengthwise end side when the hose clamp is in a developed state.

12. A hose clamp which is formed by bending a strip-shaped metal plate material into an annular shape so as to be displaceable between a diameter-reduced state and a diameter-enlarged state, the hose clamp being configured to clamp a connection of a tubular body and a counterpart to be connected to the tubular body, the hose clamp comprising:
a wide region formed at one of two lengthwise sides so as to be relatively wider and having bifurcated portions; and
a narrow region formed at the other lengthwise side so as to be relatively narrower and having a part passed between the bifurcated portions,
wherein the wide region and the narrow region have bending portions formed integrally with the respective regions including a length range sufficient to clamp the counterpart; and
wherein the bending portions and wide and narrow regions are configured as to provide, in the hose clamp, means for providing a change in section modulus that is substantially symmetric about a Y axis that is a lengthwise central axis in a developed state of the hose clamp,
wherein the means for providing a change in the section modulus includes, to a first side of the Y-axis, a combination of flanges provided on each of the wide region sides and a diverging opening in the wide region, and to an opposite side of the Y-axis, a combination of a bead formed in a part of the narrow region located between both widthwise side edges of the narrow region together with converging side edges in the narrow region,
wherein the bead and the flanges partially overlap with respect to a circumferential length direction in the developed state of the hose clamp, and
wherein the flanges are formed by folding both side edges of the wide region to the outer surface side into a close-contact state, respectively.

13. The hose clamp according to claim 9, wherein the bead and flanges extend radially outward from respective supporting regions in the narrow and wide regions of the hose clamp.

* * * * *

UNITED STATES PATENT AND TRADEMARK OFFICE
CERTIFICATE OF CORRECTION

PATENT NO. : 10,005,600 B2
APPLICATION NO. : 14/893650
DATED : June 26, 2018
INVENTOR(S) : Yuji Nakamura It is certified that error appears in the above-identified patent and that said Letters Patent is hereby corrected as shown below:

In the Claims

In Claim 7 (Column 9, Line 32):
Change "into an are shape, respectively" to --into an arc shape, respectively--

Signed and Sealed this
Twenty-eighth Day of August, 2018

Andrei Iancu
*Director of the United States Patent and Trademark Office*